United States Patent
Rodney

(10) Patent No.: US 10,539,706 B2
(45) Date of Patent: Jan. 21, 2020

(54) TARGET WELL RANGING METHOD, APPARATUS, AND SYSTEM

(71) Applicant: Halliburton Energy Services, Inc., Houston, TX (US)

(72) Inventor: Paul F. Rodney, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/700,547

(22) Filed: Sep. 11, 2017

(65) Prior Publication Data

US 2017/0371064 A1    Dec. 28, 2017

Related U.S. Application Data

(63) Continuation of application No. 14/439,081, filed as application No. PCT/US2013/078107 on Dec. 27, 2013, now abandoned.

(51) Int. Cl.
*G01V 3/38* (2006.01)
*G01V 3/28* (2006.01)
(Continued)

(52) U.S. Cl.
CPC ............. *G01V 3/38* (2013.01); *E21B 47/02* (2013.01); *E21B 47/122* (2013.01); *G01V 3/28* (2013.01)

(58) Field of Classification Search
CPC ...................................................... G01V 3/38
See application file for complete search history.

(56) References Cited

U.S. PATENT DOCUMENTS

| 4,016,942 A | 4/1977 | Wallis, Jr. et al. |
| 4,072,200 A | 2/1978 | Morris et al. |

(Continued)

FOREIGN PATENT DOCUMENTS

| RU | 2342527 C2 | 12/2008 |
| RU | 2468200 C2 | 11/2012 |

(Continued)

OTHER PUBLICATIONS

"Australian Application Serial No. 2013408804, First Examiners Report dated Jul. 18, 2016", 3 pgs.

(Continued)

*Primary Examiner* — Huy Q Phan
*Assistant Examiner* — Adam S Clarke
(74) *Attorney, Agent, or Firm* — Gilliam IP PLLC

(57) ABSTRACT

A ranging signal and a reference signal are generated. The reference signal has a lower frequency than the ranging signal. The reference signal is transmitted through a geological formation to be received by a ranging tool in a ranging well while the ranging signal is launched down a target well. The reference signal is reconstructed in the ranging well and a signal that is a combination of the ranging signal launched from the target well and noise are received in the ranging well. The received signal may be in the form of magnetic or electric field values or changes in these fields. The reconstructed reference signal, in combination with the received signal, is used to produce a filtered ranging signal. A relative location of the target well can then be determined in relation to the ranging well based on the filtered ranging signal. The location information can be used to direct drilling operations.

14 Claims, 9 Drawing Sheets

(51) Int. Cl.
*E21B 47/02* (2006.01)
*E21B 47/12* (2012.01)

(56) References Cited

U.S. PATENT DOCUMENTS

| | | | |
|---|---|---|---|
| 4,239,965 A * | 12/1980 | Oliver | G01V 5/101 |
| | | | 250/262 |
| 4,372,398 A | 2/1983 | Kuckes | |
| 4,737,794 A | 4/1988 | Jones | |
| 4,791,373 A | 12/1988 | Kuckes | |
| 4,933,640 A | 6/1990 | Kuckes | |
| 5,084,678 A | 1/1992 | Hutin | |
| 5,343,152 A | 8/1994 | Kuckes | |
| 5,589,775 A | 12/1996 | Kuckes | |
| 5,676,212 A | 10/1997 | Kuckes | |
| 5,838,727 A | 11/1998 | Lyon et al. | |
| 6,435,286 B1 | 8/2002 | Stump et al. | |
| 6,736,222 B2 | 5/2004 | Kuckes et al. | |
| 7,212,132 B2 | 5/2007 | Gao | |
| 7,219,748 B2 | 5/2007 | Gao et al. | |
| 7,686,099 B2 | 3/2010 | Rodney | |
| 7,962,287 B2 | 6/2011 | Clark | |
| 8,180,309 B2 | 5/2012 | Kimmig et al. | |
| 8,289,024 B2 | 10/2012 | Clark et al. | |
| 8,310,239 B2 | 11/2012 | Zhang et al. | |
| 2003/0006071 A1 * | 1/2003 | Stump | E21B 7/046 |
| | | | 175/61 |
| 2005/0183887 A1 | 8/2005 | Rodney | |
| 2010/0256913 A1 | 10/2010 | Kuckes | |
| 2011/0108277 A1 | 5/2011 | Dudley et al. | |
| 2012/0158305 A1 | 6/2012 | Rodney et al. | |
| 2012/0194195 A1 | 8/2012 | Wisler et al. | |
| 2012/0268135 A1 * | 10/2012 | Marsala | G01V 3/30 |
| | | | 324/338 |
| 2014/0142855 A1 * | 5/2014 | Liu | E21B 47/12 |
| | | | 702/6 |
| 2014/0169128 A1 * | 6/2014 | Orban | G01V 1/143 |
| | | | 367/25 |
| 2015/0378044 A1 * | 12/2015 | Brooks | G01P 15/00 |
| | | | 702/9 |
| 2016/0025887 A1 | 1/2016 | Rodney | |

FOREIGN PATENT DOCUMENTS

| | | |
|---|---|---|
| RU | 2541990 C1 | 2/2015 |
| WO | 9739218 A1 | 10/1997 |
| WO | 2012134468 A1 | 10/2012 |

OTHER PUBLICATIONS

"Canadian Application Serial No. 2,930,529, First Office Action dated Apr. 24, 2017.", 5 pages.

"European Application Serial No. 13891640.8, Communication Pursuant to Article 94(3) EPC dated Mar. 24, 2017", 4 pages.

"European Application Serial No. 13891640.8, Communication Pursuant to Article 94(3) EPC dated Aug. 10, 2016", 6 pgs.

"European Application Serial No. 13891640.8, Extended European Search Report dated Nov. 10, 2015", 5 pgs.

"European Application Serial No. 13891640.8, Office Action dated Nov. 27, 2015", 1 pg.

"International Application Serial No. PCT/US2013/078107, International Preliminary Report on Patentability dated Jul. 7, 2016", 7 pgs.

"International Application Serial No. PCT/US2013/078107, International Search Report dated Sep. 25, 2014", 3 pgs.

"International Application Serial No. PCT/US2013/078107, Written Opinion dated Sep. 25, 2014", 5 pgs.

"Russian Application Serial No. 2016115085, Office Action dated Aug. 23, 2016", 4 pgs.

Indonesian Application Serial No. P00201603077; First Office Action; dated Feb. 7, 2019, 3 pages.

Indian Application Serial No. 201617016296; First Examination Report; dated Mar. 26, 2019, 6 pages.

* cited by examiner

TARGET WELL RANGING METHOD, APPARATUS, AND SYSTEM

BACKGROUND

Currently, it is desirable to know the location of a target well in relation to a ranging well that may be used for operations such as steam assisted gravity drainage (SAGD).

DETAILED DESCRIPTION

Figure 1:
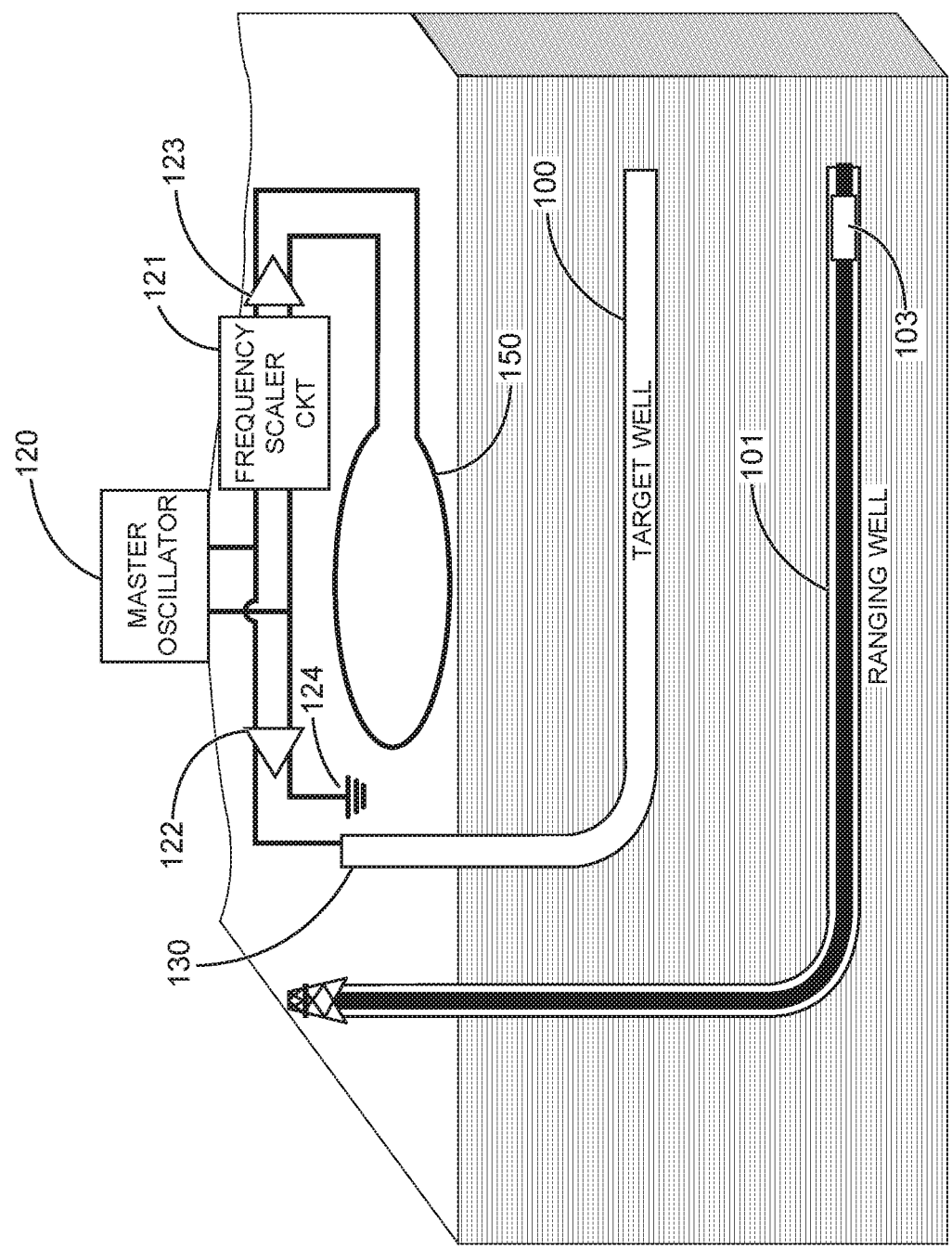
FIG. 1 illustrates an embodiment of a system for target well ranging.

The various embodiments described herein operate to provide information that assists in verifying of a well being drilled near at least one other well. For example, determining a location of a target well in relation to a ranging well.

For purposes of clarity, a "target well" will be defined as a well, the location of which is to be used as a reference for the construction of another well. The other well will be defined as a "ranging well." Other embodiments may reverse this terminology since the embodiments are not limited to any one well being the target well and any one well being the ranging well. In most embodiments, the location of the ranging well is fairly well known, the location of the target well is not as well known, and it is the distance from the ranging well to the target well that is to be determined.

Several technologies for ranging from a ranging well to a remote casing in a target well are based upon launching a current at a known frequency from the earth's surface down the casing of the target well and receiving a signal radiated from that casing in the ranging well. Due to propagation through different geological formations, the received signals can be very weak, especially considering that several technologies rely on measuring a magnetic gradient across the relatively small diameter of a logging or drilling tool. Subsequently described embodiments can operate to increase the signal-to-noise ratio in a signal received by a magnetic ranging tool, resulting in increased accuracy of determining a distance between the ranging well and the target well as well as boosting the range at which target wells can be reliably detected in order to plan well intersection or well collision avoidance.

At close range, the present embodiments can enable operation at higher frequencies than were previously possible. Some embodiments can be easily generalized to other ranging tools that make use of signals from a well to which ranging occurs (e.g., a target well). Examples of such tools include those that range using electric fields, or a combination of electric and magnetic fields. The embodiments herein can be useful when ranging to wells through highly conductive geological formations.

The embodiments for target well ranging, illustrated in FIGS. 1-4, include some common characteristics. For example, the embodiments generate a ranging signal directly from a clock signal, generated by a master oscillator, and a reference signal based on the clock signal. The resulting reference signal is at a significantly lower frequency than the ranging signal. An apparatus, coupled to a downhole tool, includes reconstruction circuitry to reconstruct the reference signal from a received signal that was propagated to the downhole tool.

Embodiments can include one or more magnetometers, magnetic gradiometers, or electric field sensors to measure field values or changes in field values induced by the target well based on the ranging signal being transmitted down the target well. The relative location of the target well can then be determined in relation to the ranging well based on a relationship between the reconstructed reference signal and magnetic or electric field values or changes in these fields, as discussed subsequently. The relative location of the target well can include relative distance and angle from the ranging well.

The ranging signal that is transmitted on a casing of the target well can be generated directly from a master oscillator. The reference signal is derived from the same master oscillator. However, the frequency of the reference signal is different from that of the ranging signal driving the casing. The reference signal is obtained by using a frequency multiply and divide circuit (e.g., frequency altering circuit).

If the frequency of the reference signal was only an integral fraction of the master oscillator frequency, harmonic distortion in this signal might easily be confused with the ranging signal to be detected. That is, such a harmonic can corrupt the received ranging signal. This can also corrupt the reference to a lock-in amplifier used in the system (to be described in more detail later). Hence, in various embodiments, the reference signal is generated by dividing the frequency of the master oscillator by an integer "n" and multiplying by a different integer "m", where m/n<1. For example, if the ranging signal has a frequency of 5 Hz, a signal at 5/7 Hz can first be generated, and then a signal at 2*5/7 Hz can be generated from that. The fundamental and first three harmonics of such a signal are 1.4285 Hz, 2.8571 Hz, 4.28571 Hz, and 5.7143 Hz.

Signals at any of these frequencies can be easily separated from the 5 Hz ranging signal emanating from the casing of the target well. The fundamental (1.4285 Hz in this example) can propagate through the earth with considerably less signal loss than the 5 Hz ranging signal.

Lock-in amplifiers, as described subsequently, can achieve a separation of signals that are far closer in frequency than those of the example used above, even if signal loss through the earth is severe. Thus, it may be possible to provide a reference signal at an even lower frequency than this example without causing signal corruption of the ranging signal. For example, using a ratio of 2/17 of the base frequency, the fundamental and first 8 harmonics of a 5 Hz signal are 0.5882 Hz, 1.1765 Hz, 2.3529 Hz, 2.9412 Hz, 3.5294 Hz, 4.1177 Hz, 4.7059 Hz, and 5.2941 Hz.

FIG. 1 illustrates an embodiment of a system for target well ranging. This system uses a transmitter circuit comprising a large area current loop 150 (e.g., loop antenna) to launch the reference signal into the geological formation above the ranging well 101. The loop antenna 150 can be simply a large conductor near or in contact with the surface of the geological formation.

The system comprises the master oscillator 120 which is a precision clock. It is desirable that the frequency of this clock be relatively stable, as defined subsequently. The ability of the subsequently described lock-in amplifiers to discriminate against noise is a function of the stability of the reference signal, generated from the master oscillator 120, and of the integration time used in the lock-in amplifier. Thus, the more stable the clock, the better the discrimination performance of the lock-in amplifiers.

The master oscillator 120 is coupled to a power amplifier 122 (e.g., balanced input/output amplifier) that has an output coupled to the casing 130 of the target well 100 and an output coupled to a grounded electrode 124. The power amplifier 122 provides the power necessary to launch the ranging signal down the target well 100.

A frequency scaler circuit 121 (e.g., frequency divider and multiplier) is coupled to the master oscillator 120. The frequency scaler circuit 121 provides the down-converted reference signal for transmission. The frequency scaler circuit 121 divides the frequency of the clock signal from the master oscillator 120 by the first integer "n" and multiplies the result by the second integer "m" such that m/n<1.

A power amplifier 123 (e.g., balanced input/output amplifier) is coupled to the output of the frequency scaler circuit 121. The power amplifier 123 provides the power used to launch the reference signal into the geological formation above the ranging and target wells 100, 101. An embodiment of the reference signal generator and transmitter circuitry 120, 121, 123 is described subsequently with reference to FIG. 5.

The system further comprises a ranging tool 103 in the ranging well 101. The ranging tool 103 can be a downhole tool that is part of the drill string in the ranging well 101. The ranging tool 103 includes the apparatus for sensing the magnetic or electric fields for determining a relative location of the target well 100 from the ranging well 101. The apparatus for sensing the magnetic or electric fields is described subsequently in greater detail with reference to FIG. 6.

Figure 2:
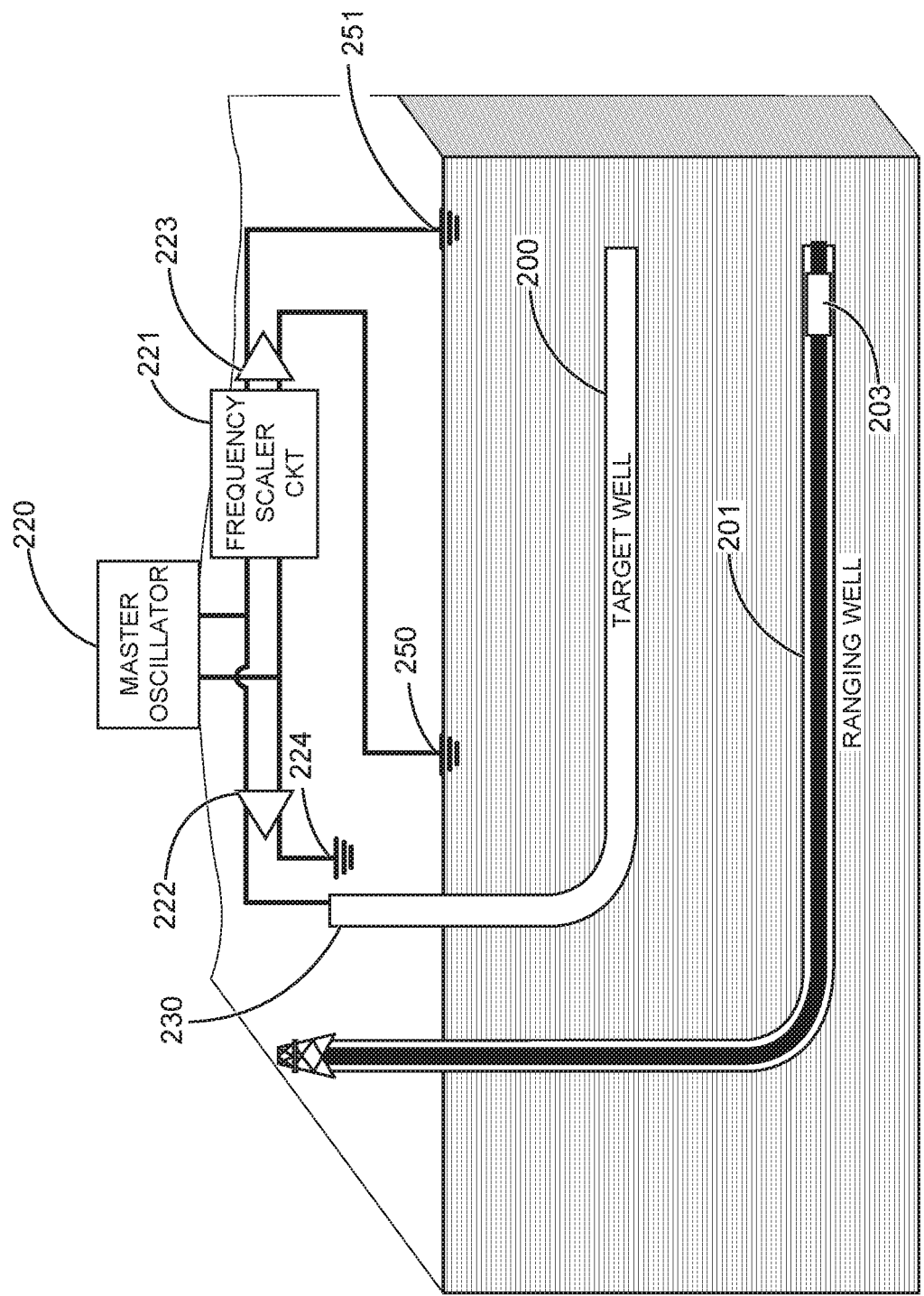
FIG. 2 illustrates another embodiment of a system of target well ranging.

FIG. 2 illustrates another embodiment of a system for target well ranging. This system uses a transmitter circuit comprising one or more ground contacts (e.g., dipole transmitters) 250, 251 to launch the reference signal into the geological formation above the target well 200 and the ranging well 201.

The system comprises the master oscillator 220 that is coupled to the power amplifier 222 having an output coupled to the casing 230 of the target well 200 and an output coupled to a grounded electrode 224. The power amplifier 222 (e.g., balanced input/output amplifier) provides the power used to launch the ranging signal down the target well 200.

The frequency scaler circuit 221 (e.g., frequency divider and multiplier) is coupled to the master oscillator 220. The frequency scaler circuit 221 provides the down-converted reference signal for transmission. The frequency scaler circuit 221 provides a signal at a frequency that is obtained by dividing the frequency of the clock signal from the master oscillator 220 by a first integer "n" and multiplying the frequency of the result by a second integer "m" such that m/n<1.

The power amplifier 223 (e.g., balanced input/output amplifier) is coupled to the output of the frequency scaler circuit 221. The power amplifier 223 provides the power used to launch the reference signal, through the ground contacts 250, 251, into the geological formation above the ranging and target wells 200, 201. An embodiment of the reference signal generation circuitry 220, 221, 223 is described subsequently with reference to FIG. 5.

The system further comprises the ranging tool 203 in the ranging well 201. The ranging tool 203 can be a downhole tool that is part of the drill string in the ranging well 201. The ranging tool 203 includes the apparatus for sensing the magnetic or electric fields for determining a relative location of the target well 200 from the ranging well 201. The apparatus for sensing the magnetic or electric fields is described subsequently in greater detail with reference to FIG. 6.

Figure 3:
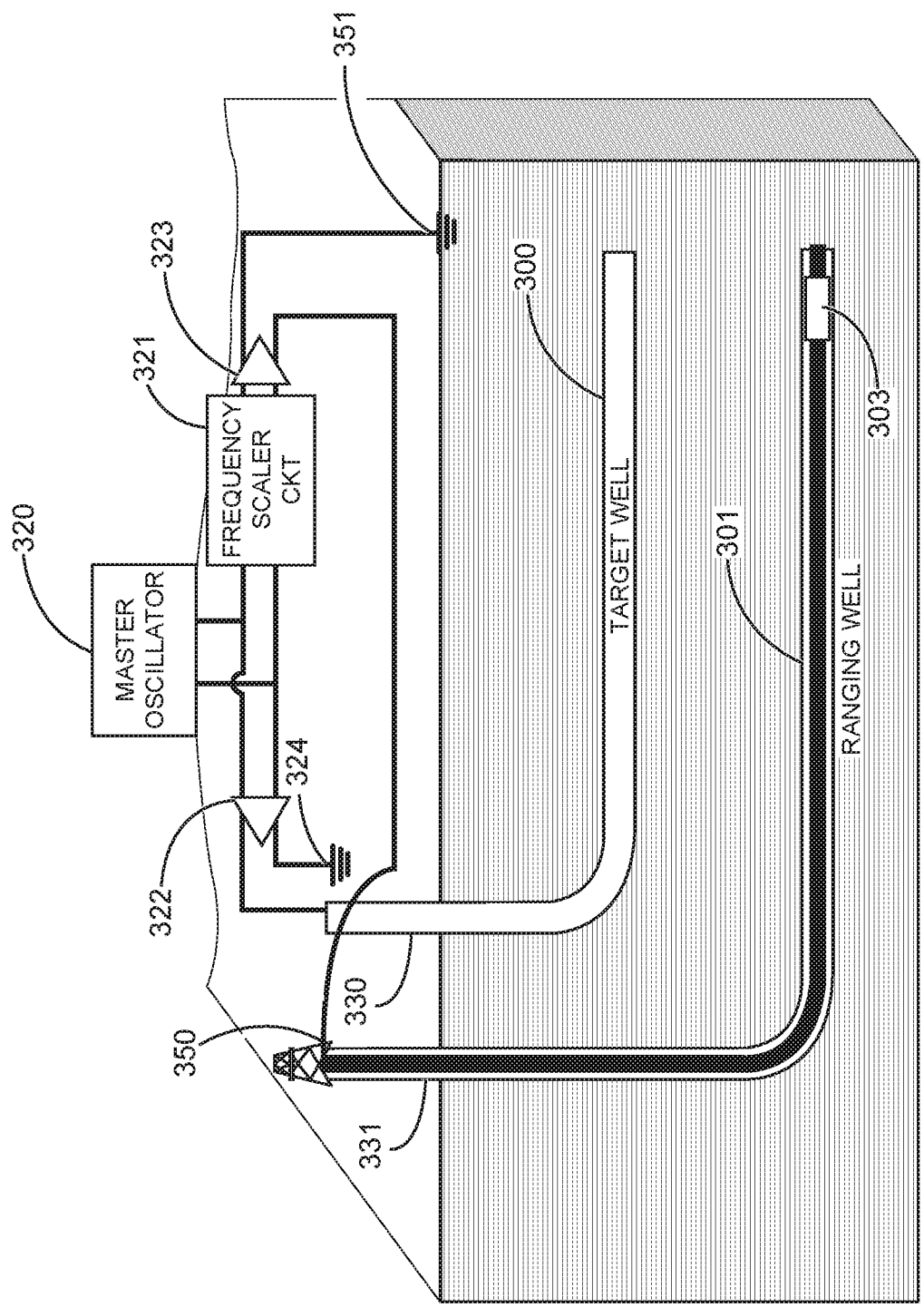
FIG. 3 illustrates another embodiment of a system of target well ranging.

FIG. 3 illustrates another embodiment of a system for target well ranging. This system uses an electrode 351 in the surface and an electrode 350 coupled to the casing 331 of the well containing the ranging tool 303 (e.g., ranging well) in order to launch the reference signal into the geological formation above the target well 300 and the ranging well 301, as well as down the length of the ranging well 301.

The system comprises the master oscillator 320 that is coupled to the power amplifier 322 (e.g., balanced input/output amplifier) that has an output coupled to the casing 330 of the target well 300 and an output coupled to a grounded electrode 324. The power amplifier 322 provides the power used to launch the ranging signal down the target well 300.

A frequency scaler circuit 321 (e.g., frequency divider and multiplier) is coupled to the master oscillator 320. The frequency scaler circuit 321 provides the down-converted reference signal for transmission. The frequency scaler circuit 321 divides the clock signal from the master oscillator 320 by a first integer "n" and multiplies the result by a second integer "m" such that m/n<1.

The power amplifier 323 (e.g., balanced input/output amplifier) is coupled to the output of the frequency scaler circuit 321. The power amplifier 323 provides the power used to launch the reference signal into the geological formation above the ranging and target wells 300, 301 as well as down the ranging well 301. The power amplifier 323 has an output coupled to an electrode 351 in the ground and an output coupled to an electrode 350 coupled to the well casing of the ranging well 301. An embodiment of the reference signal generation circuitry 320, 321, 323 is described subsequently with reference to FIG. 5.

The system further comprises a ranging tool 303 in the ranging well 301. The ranging tool 303 can be a downhole tool that is part of the drill string in the ranging well 301. The ranging tool 303 includes the apparatus for sensing the magnetic or electric fields for determining a relative location of the target well 300 from the ranging well 301. The apparatus for sensing the magnetic or electric fields is described subsequently in greater detail with reference to FIG. 6.

Figure 4:
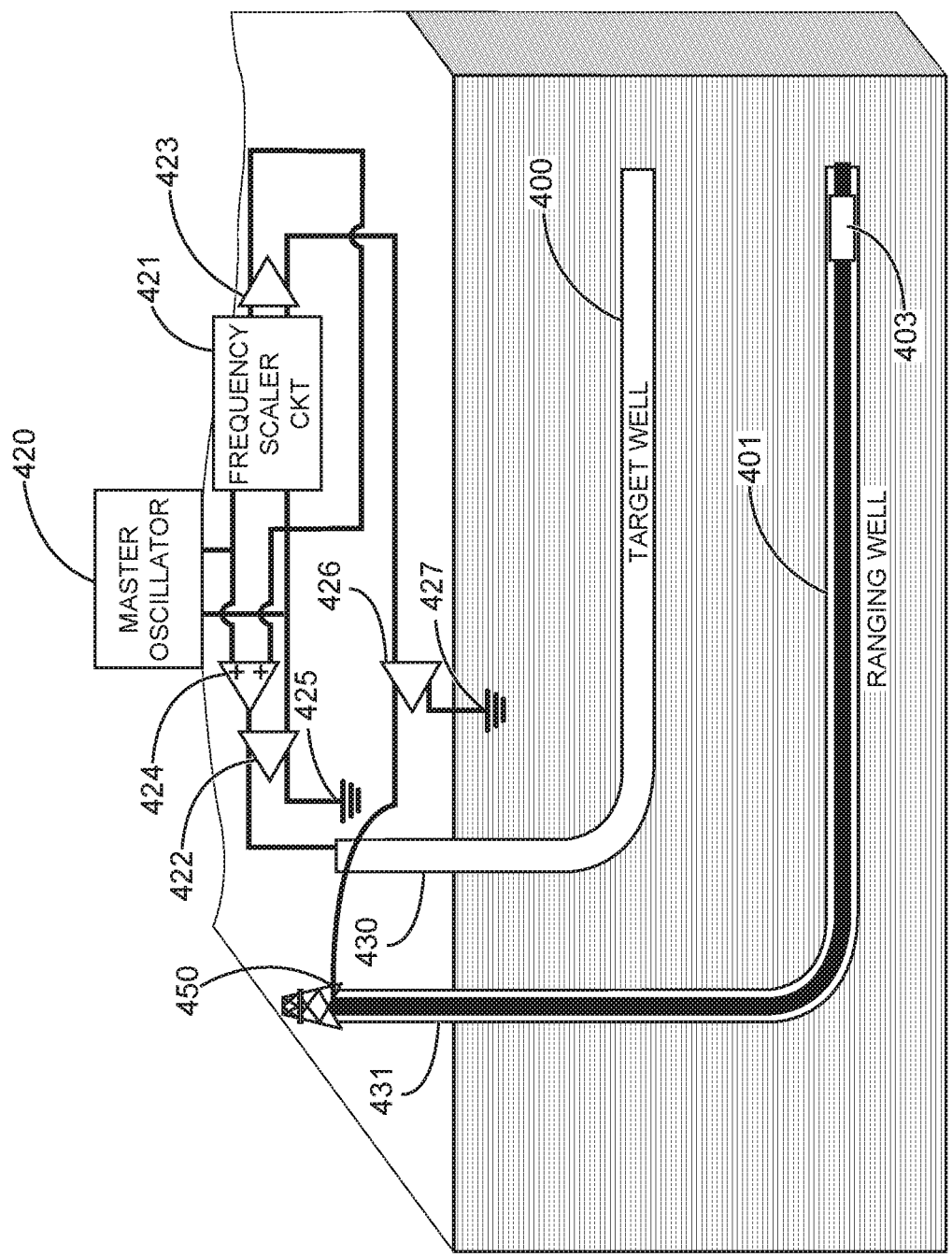
FIG. 4 illustrates another embodiment of a system of target well ranging.

FIG. 4 illustrates another embodiment of a system for target well ranging. This system uses a summing amplifier 424 to add the reference signal to the ranging signal prior to coupling the resulting summed signal to the casing 430 of the target well 400.

The system comprises a master oscillator 420 that is coupled to the summing amplifier 424, which in turn has an output coupled to a power amplifier 422 (e.g., balanced input/output amplifier). An output of the power amplifier 422 is coupled to the casing 430 of the target well 400 and another output of the power amplifier 422 is coupled to a grounded electrode 425. The power amplifier 422 provides the power used to launch the ranging signal down the target well 400.

A frequency scaler circuit 421 (e.g., a frequency divider and multiplier) is coupled to the master oscillator 420. The frequency scaler circuit 421 provides the down-converted reference signal for transmission. The frequency scaler circuit 421 divides the clock signal from the master oscillator 420 by a first integer "n" and multiplies the result by a second integer "m" such that $m/n<1$.

A first amplifier 423 (e.g., balanced input/output amplifier) is coupled to the output of the frequency scaler circuit 421. An output of the amplifier 423 is coupled to an input of the summing amplifier 424 so that the summing amplifier 424 can add the reference signal to the ranging signal prior to launching the summed result down the target well 400. A power amplifier 426 has an input coupled to an output of the amplifier 423, an output coupled to a grounded electrode 427, and an output coupled to the well casing 450 of the ranging well 401. The power amplifier 426 provides the power used to launch the reference signal down the ranging well 401. An embodiment of the reference signal generation circuitry 420, 421, 423 is described subsequently with reference to FIG. 5.

The system further comprises a ranging tool 403 in the ranging well 401. The ranging tool 403 can be a downhole tool that is part of the drill string in the ranging well 401. The ranging tool 403 includes the apparatus for sensing the magnetic or electric fields for determining a relative location of the target well 400 from the ranging well 401. The apparatus for sensing the magnetic or electric fields is described subsequently in greater detail with reference to FIG. 6.

The embodiments of FIGS. 1-4 provide different ways for transmitting the reference signal. For example, some embodiments might be appropriate when safety requirements would preclude embodiments in which the transmitted signal, often a high energy signal, might present a hazard to rig personnel or an explosion hazard.

Figure 5:
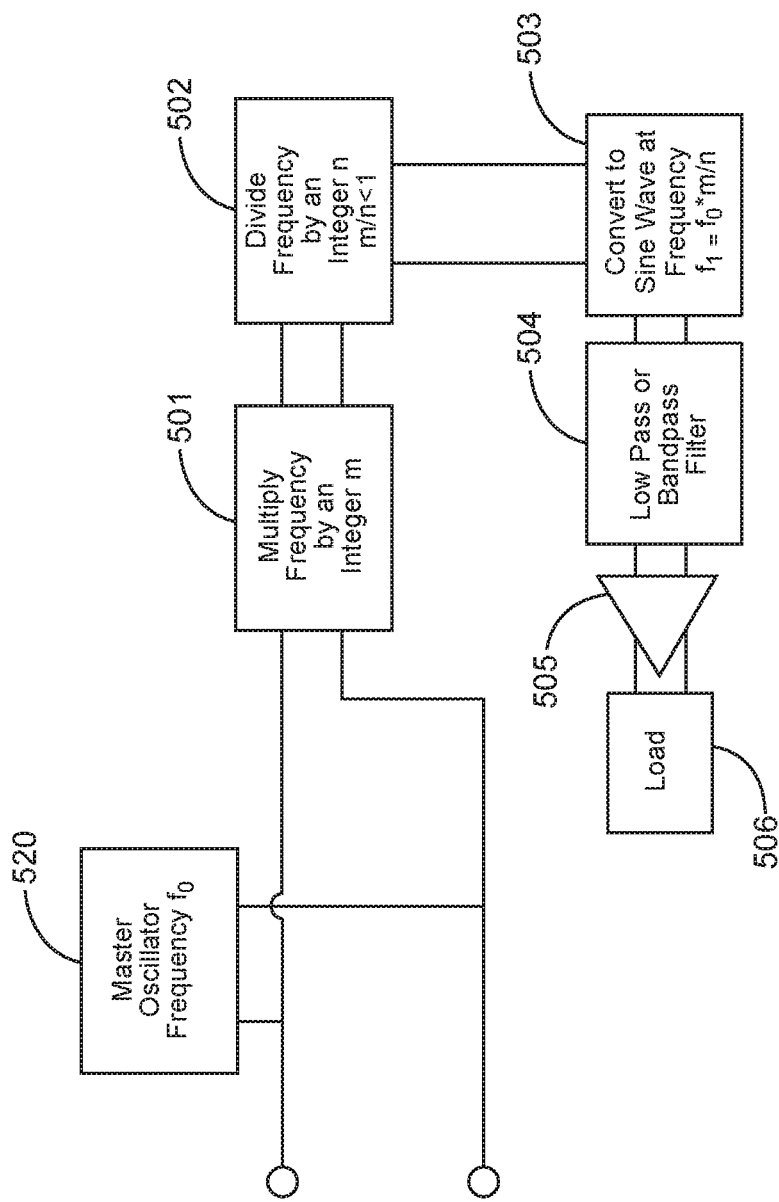
FIG. 5 illustrates an embodiment of a circuit for generating a reference signal in accordance with the systems of FIGS. 1-4.

FIG. 5 illustrates an embodiment of the reference signal generating circuitry. The embodiment of FIG. 5 is for purposes of illustration only as the reference signal can be generated in other ways. This circuit generates the reference signal having a frequency of $f_0 \cdot m/n$ cycles per second, where $f_0$ is the frequency of the master oscillator (e.g., precision clock).

The circuit is comprised of the master oscillator 520 that generates the clock signal. A multiplying circuit 501 multiplies the frequency $f_0$ by the integer "m". The result, $mf_0$, is then input to a dividing circuit 502 that divides the result by the integer "n" to generate a reference signal having a frequency of $f_0 \cdot m/n$.

A conversion circuit 503 takes the clock signal from the dividing circuit 502 and converts it to a sine wave having a frequency of f where $f = f_0 \cdot m/n$. In another embodiment, the conversion circuit 503 may be left out by simply filtering the output of the dividing circuit 502. The sine wave from the conversion circuit 503 is input to a filter (e.g., lowpass, bandpass) 504 that eliminates unwanted frequencies proximate to the reference frequency. An amplifier 505 provides the power necessary for transmission of the signal to a load 506 according to one or more of the above-described embodiments. The load 506 can be a transmitter 150, ground contacts 250, 251, a casing connection 350 and ground connection 351, or a casing connection 450 and ground connection 427.

In another embodiment, the reference signal can be generated in the digital domain. In the case of a digital implementation, where the reference signal exists in digital form, the digital form of the reference signal is converted to an analog format using a digital-to-analog converter. The resulting reference signal is bandpass-filtered in order to remove the effects of the discretization of the signal. Generally, a bandpass or a lowpass filter may also be used with analog implementations of multipliers and dividers since nonlinearities may exist in these circuits.

Figure 6:
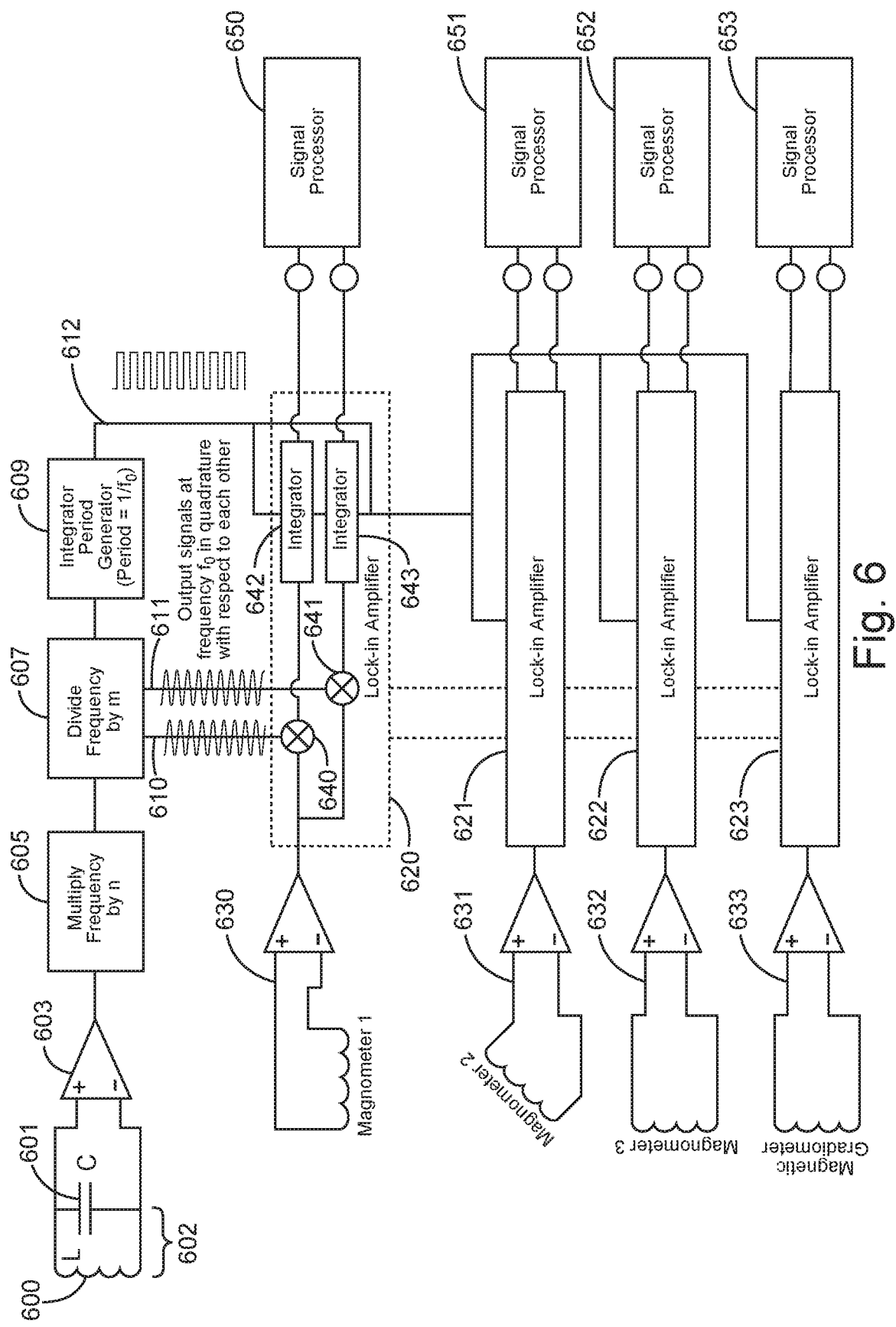
FIG. 6 illustrates an embodiment of an apparatus for reconstructing a received reference signal and detecting a magnetic or electric field in accordance with the embodiments of FIGS. 1-4.

FIG. 6 illustrates a block diagram of an embodiment of an apparatus for reconstructing a received reference signal and detecting a magnetic or electric field in accordance with the embodiments of FIGS. 1-4. The apparatus of FIG. 6 can be located in a ranging tool as part of the drill string in the ranging well. FIG. 6 illustrates how a lock-in amplifier can be used with the reference and ranging signals to improve the signal-to-noise ratio over that obtained with prior art filtering techniques for ranging signals that do not make use of a reference signal.

The bock diagram of FIG. 6 is for purposes of illustration only as the reference signal can be reconstructed using other embodiments (e.g., digitally) and the illustrated magnetometers can be replaced with gradiometers to detect an electric field. Other embodiments can use different quantities of magnetometers and/or gradiometers depending on the granularity desired for detecting the reference signal.

The magnetic or electric fields detected by the apparatus arise from fields induced in the target well as a result of the ranging signal being launched down the target well. Thus, the signal received as detected magnetic or electric fields can be considered to comprise the ranging signal in combination with noise. This noise can be filtered using the reconstructed reference signal to produce a filtered ranging signal, as described subsequently.

The apparatus of FIG. 6 comprises a solenoidal or toroidal antenna 600 in parallel with a capacitor 601 to form a filtering element 602 (e.g., resonant circuit). The resonant frequency of this circuit is set to a frequency $f_1$ (i.e., the fundamental frequency) of the reference signal. In another embodiment, a bandpass filter can be used as the filtering element 602. The intent is to avoid corruption of the reference signal by the ranging signal. The filtering element 602 also serves to improve the detection of the reference signal by filtering out noise near the reference frequency.

An amplifier 603 is coupled to the output of the filtering element 602, which may comprise a resonant circuit or filter. The amplifier 603 outputs the amplified received signal at a frequency of $f_1$ to a frequency multiplier circuit 605 that outputs a signal having a frequency $n*f_1$, where "n" is an integer as defined earlier. The output of the multiplier circuit 605 is input to a frequency divider circuit 607 that develops a signal at a frequency of $n*f_1/m$, where "m" is an integer as defined earlier. Since $n*f_1/m=f_0$, this creates a signal at precisely the frequency of the signal that is launched onto the target well. Neglecting propagation delay, which is small in comparison to signal acquisition time, this signal will track slow drifts in the reference frequency $f_0$.

Three signals are generated from this signal at frequency $f_0$. Two of these signals 610, 611 are in quadrature. That is, one can be represented as an amplitude times a sine wave at frequency $f_0$ with a certain phase shift while the other can be represented as an amplitude times a cosine wave at frequency $f_0$ with the same phase shift (or a sine wave with an additional phase shift of 90° over that of the first sine wave). The third signal 612, shown as a rectangular wave, is generated from an integrator period generator circuit 609 that generates a rectangular wave having a period that is an integer multiple of $1/f_0$. The output signal 612 is used to set the time over which two integrator circuits 642, 643 in each of a plurality of lock-in amplifiers 620-623 operate.

The two quadrature signals 610, 611 are coupled to the plurality of lock-in amplifiers 620-623 as reference signals. The rectangular wave output signal from the integrator period generator circuit 609 is also coupled to each of the lock-in amplifiers 620-623. Outputs of a 3-axis magnetometer 630-633 are coupled to respective lock-in amplifiers 620-623.

The magnetometers 630-633 are used to detect the magnetic field. At least one magnetometer is used to detect the reference signal while at least one magnetometer (or at least one magnetic gradiometer) is used to detect the ranging signal. The magnetometers 630-633 can be flux gate magnetometers, magnetoresistive magnetometers, spin exchange relaxation-free (SERF) or similar atomic magnetometers (or any other devices with a similar use) as well as inductors or toroids when used to receive a time varying magnetic field. It is possible to receive the reference and ranging signals with the same magnetometer(s). The magnetometers can be vector magnetometers (i.e., magnetometers that have a preferred sense axis) or scalar magnetometers (i.e., magnetometers that measure the magnitude of the magnetic field). In some ranging applications, multiple axis magnetometers can be used. The magnetometers associated primarily with detection of the ranging signal are generally vector type magnetometers.

The outputs of the lock-in amplifiers 620-623 are transmitted to one or more signal processors 650-653 to monitor the detected signals in the ranging well to determine a relative location of the ranging well in relation to the target well based on the relationship between the detected magnetic fields (e.g., filtered ranging signal) based on measurements made at a plurality of positions in the ranging well. Another embodiment can use only a single signal processor with multiple inputs for processing the signals. In another embodiment, an inference can be made from a single measurement in the ranging well based on a magnetic gradient. The reference signal can be used as a reference frequency for the lock-in amplifiers.

In operation, using magnetometer 630 as an example, the output of a first magnetometer 630 is amplified and possibly bandpass filtered and then fed to a pair of mixers 640, 641. Each mixer 640, 641 has two inputs and multiplies both of these inputs together to produce an output signal. The second input to one of the mixers is the sine wave 610 at frequency $f_0$, while the second input to the other mixer is the cosine wave 611 at frequency $f_0$. To better illustrate the operation of the mixers 640, 641, and later of the integrators 642, 643, signal terminology and equations will now be introduced.

Setting $S_m$ as the output of a magnetometer that is used as one input to a mixer:

$$S_m = A_r \cdot \sin(2\pi \cdot f_0 \cdot t + \theta) + N_r(t) + N_i(t),$$

where $A_r$ is the amplitude of the ranging signal received at the ranging tool and may include a gain factor;
$f_0$ is the frequency in Hz of the ranging signal;
$t$ is the time in seconds;
$\theta$ is a phase factor related to the time reference and the propagation delay of the signal from the casing of the target well to the ranging tool;
$N_r(t)$ is the received noise at the magnetometer; and
$N_i(t)$ is the instrumentation noise added by the electronics at the magnetometer input to the mixer.

The sinusoidal input to the mixer, $R_s$ is given by:

$$R_S = B \cdot \sin(2\pi \cdot f_0 \cdot t + \varphi) + N(t);$$

where B is the amplitude of the sinusoidal output of the circuit that regenerated the signal at frequency $f_0$ from the received signal at $f_1$;
$\varphi$ is a phase factor, similar to $\theta$. Note that $\varphi$ and $\theta$ will vary slowly with time as the ranging tool is moved in the borehole; and
$N(t)$ is the electronic noise from the circuit that regenerated the signal at frequency $f_0$.

Using the above equations for $S_m$ and $R_S$, the output of the first mixer is given by:

$$S_m(t) * R_S(t) = N(t)(N_i(t) + N_r(t)) + \frac{1}{2} A_r B \cos(\theta - \varphi) +$$
$$\sin(2\pi t f_0)(\cos(\theta) A_r N(t) + \cos(\varphi) B N_i(t) + \cos(\varphi) B N_r(t)) +$$
$$\cos(2\pi t f_0)(\sin(\theta) A_r N(t) + \sin(\varphi) B N_i(t) + \sin(\varphi) B N_r(t)) +$$
$$\frac{B}{2} A_r \cos(4\pi t f_0 - \theta - \varphi).$$

By a simple trigonometric identity, the product of the two components at frequency $f_0$ is a constant+a component at frequency $f_0$+a component at a frequency of $2*f_0$. The individual noise terms are multiplied by sine and cosine terms at frequency $f_0$ or by each other. The output of the second mixer 641 is calculated in an analogous fashion.

The outputs of the two mixers 640, 641 are then sent to integrators 642, 643 and integrated over N cycles with period $1/f_0$, that is for a time of $N/f_0$ seconds. In integrating over an integer number of cycles at frequency $f_0$, the terms at a frequencies $f_0$ and $2*f_0$ become 0. If the noises are truly random noises, only the component that is coherent with frequency $f_0$ makes any contribution to the integral and, so, the noise component from these terms is greatly reduced. Likewise, assuming that the noise terms are not correlated, the first term, a product of noise terms, will be greatly reduced upon integration. This leaves only the term $\frac{1}{2} A_r B \cos(\theta-\varphi)$ from the result in the above equation and a similar term $\frac{1}{2} A_r B \sin(\theta-\varphi)$ from the integrator 643.

The outputs of the integrators 642, 643 are sensed by electronics after the period of $N/f_0$, the integrators 642, 643 are reset and another integration period of $N/f_0$ seconds commences (there are ways of dealing with these outputs as analog signals; in some embodiments, an analog to digital converter would be used along with signal processing hardware and software to accomplish this task).

The resulting sampled data streams have random noise reduced by the square root of N with respect to the noise at the inputs to the integrators 642, 643. The root mean square of the sum of the outputs from the two integrators 642, 643 will be proportional to the output of the magnetometer 1 630, but with significantly reduced noise. The ratio of the amplitudes of the two signals from the integrators 642, 643 provides some information about the propagation of the signals through the earth, but are not usually of interest for ranging. In some embodiments, a sudden change in this ratio (which is the tangent of the phase of the ranging signal with respect to that of the recovered signal at frequency $f_0$ used for the reference) provides an indication of a significant change at the target well or a significant change in the relation between the target well and the ranging tool, so the phase or ratio of phases may be monitored.

In some embodiments, all or part of the lock-in amplifiers 620-623 can be implemented using A/D converters and digital signal processing. In that case, the digital samples should be made at some high multiple of the reference frequency $f_0$ that can be generated with another frequency multiplier.

Criteria for specifying the frequency separation between the ranging and reference signals, and for specifying the stability of the master oscillator, can be determined as described subsequently.

The selectivity of the lock-in amplifier can be examined by calculating its output when the reconstructed reference frequency differs from the frequency of the signal at the other input to the lock-in amplifiers 620-623 (in the illustrated example, this is the output of one of the other magnetometers 631-633).

Figure 7:
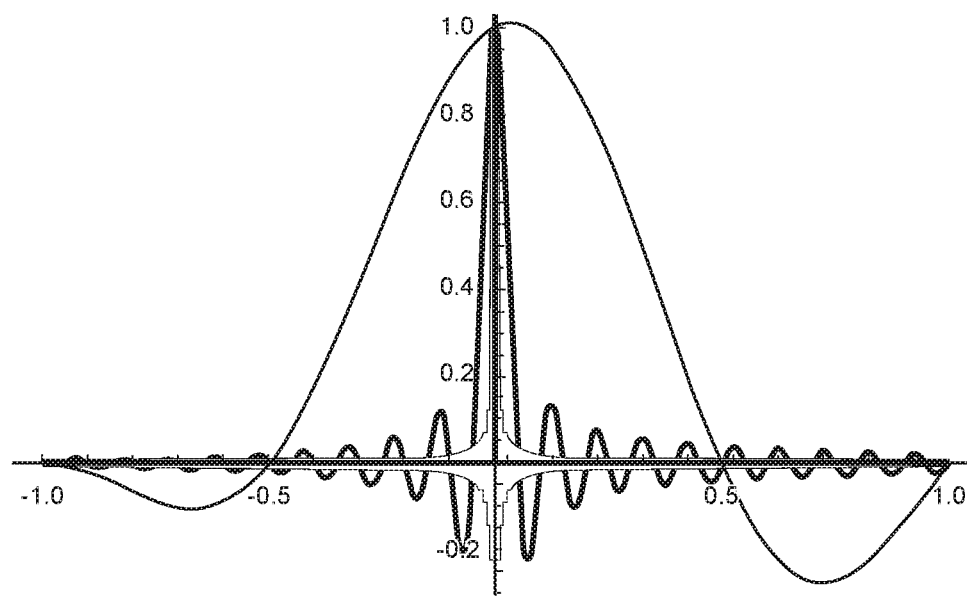
FIG. 7 illustrates a representative plot of lock-in amplifier output signals in accordance with the embodiment of FIG. 6.

The output of the lock-in amplifier for two such signals is shown in FIG. 7 for integration times of $1/f_0$, $10/f_0$, $100/f_0$ and $1,000/f_0$. To make the comparisons easier to understand, each output has been divided by the output of the lock-in amplifier when there is no difference between the signals. The abscissa of FIG. 7 is the fractional difference in frequency between the two signals. For example, at an abscissa value of 0.1, the signal input from the ranging magnetometer is $1.1*f_0$, and an abscissa value of −0.1 corresponds to a signal from the ranging magnetometer of $0.9*f_0$. As can be seen in the figure, the selectivity of the lock-in amplifier increases dramatically as the integration time is increased.

Figure 8:
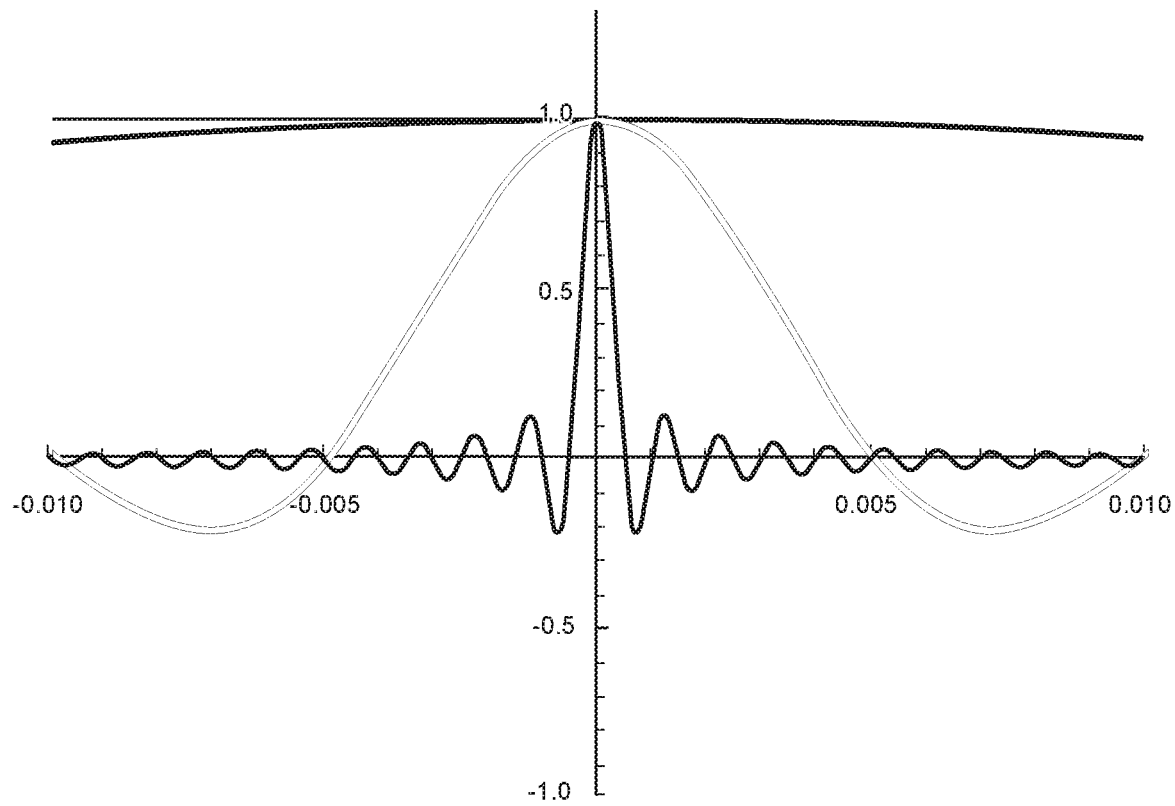
FIG. 8 illustrates an enlarged view of the plot of signals presented in FIG. 7.

The same curves are presented in FIG. 8, but the range of frequencies is reduced, covering only 0.01 times (normalized to $f_0$) that which is shown in FIG. 7. Even over the greatly reduced range of FIG. 8, the curve corresponding to integration over 1,000 cycles can be difficult to interpret. A local maximum of 0.01 occurs near a frequency offset of 0.001 (i.e. $1.001*f_0$). That is, a signal at frequency $1.001*f_0$ is reduced to 0.01 of the amplitude obtained with the same signal but with a frequency of $f_0$. This is a rejection of 40 dB. At a frequency offset of 0.01 (i.e. $1.01*f_0$), it is reduced by 60 dB. For most ranging applications, it is reasonable to use an integration time of 1,000 cycles of the ranging signal. For example, with a 5 Hz ranging signal, the integration time over 1,000 cycles is 3 minutes, 20 seconds. Shorter integration times can be used.

In a typical embodiment, the frequency of the reference oscillator is sufficiently stable that the amplitude output of the lock-in amplifier of the ranging signal does not drift to less than 0.99 of its optimal value. This corresponds to a frequency offset of $±0.0000391*f_0$. A typical ranging signal has a frequency of around 5 Hz. It takes 200 seconds to produce 1,000 cycles at 5 Hz. Therefore, a clock would have to drift by as much as 1 part in a million/second in order to produce such a frequency shift. Clocks of this quality or better are readily available.

Several embodiments also take into account the effect of receiving the frequency downshifted reference signal with the ranging signal in a magnetometer set up to receive the ranging signal. That is, the reference signal may be received at one or more of the ranging magnetometers and may be stronger than the ranging signal at these magnetometers. Since the frequency downshifted reference signal is not an integral sub-harmonic of the ranging signal, this should not create a problem as long as care is taken to properly separate its frequency (and that of any of its harmonics) from $f_0$. In an embodiment, a bandpass filter can be inserted between each ranging magnetometer and the input to the mixers in the lock-in amplifier.

Several embodiments also deal with preventing components of the ranging signal, received at the magnetometer used to receive the frequency downshifted signal, from corrupting the reconstructed signal at frequency $f_0$. This is important since an error may otherwise be introduced in re-creating a signal at frequency $f_0$. It is thus recommended that the antenna for receiving the frequency downshifted reference signal be put in resonance with a capacitor or that the output of the antenna be bandpass filtered. Even though the frequency downshifted signal may be stronger than the ranging signal, the frequency downshifted and ranging signals should be separated, in some embodiments, at the input to that part of the system which reconstructs a reference signal at frequency $f_0$.

In addition to, or as an alternative to using a resonant circuit or a filter, if the frequency downshifted signal is launched down the casing of the borehole that contains the ranging tool, it will hop to the drill pipe in the borehole, and can be detected with a toroidal antenna or as a voltage across a resistive gap. The toroid or resistive gap may not be sensitive to many forms of ranging signals. In particular, it may not be sensitive to a signal generated by launching current down the casing of the target well when the ranging and target wells are approximately parallel.

Considerations of propagation through the geological formation or the well casings can have an effect on the appropriate frequency of the reference signal and of the ranging signal to be used in a given application. Since $f_1<<f_0$, the attenuation of the reference signal at frequency $f_1$ will be less than that at frequency $f_0$. The degree of difference will depend on the specific implementation, well profile, formation resistivities, and frequencies. For the following examples, consider a system wherein the reference signal is generated at 0.5882 Hz, the frequency of the ranging signal on the target well is 5 Hz, and both signals are launched onto the target well, while the return for the signal at frequency $f_1$ is attached to a remote grounding point.

Figure 9:
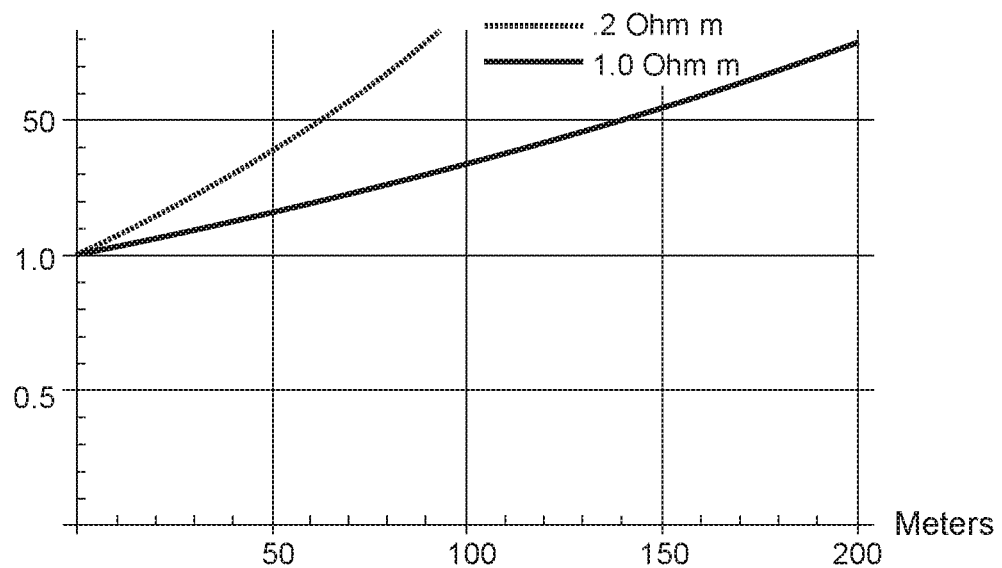
FIG. 9 illustrates a representative plot of a ratio of the signal amplitudes at the ranging tool in accordance with the embodiment of FIG. 6.

The ratio of the signal amplitudes at the ranging tool is shown in FIG. 9 for geological formation resistivities of 1 and 0.2 ohm meters as a function of distance from the ranging tool to the target well. In this figure, it is assumed that both signals have the same current in the target well. In this case, at a range of about 90 meters, and with a resistivity of 0.2 ohm meter, the signal at 0.5882 Hz is a factor of 1.8 times stronger than the signal at 5 Hz. In a 1 ohm meter formation, it is about 1.7 times stronger than the ranging signal at a range of 200 meters. As the range is decreased, the signal strength ratio decreases. However, the signal strength ratio is an increasing function of the ratio of $f_0/f_1$. Hence, it is possible to increase the frequency of the oscillator as the range is decreased and thus provide better resolution than would otherwise be possible.

Figure 10:
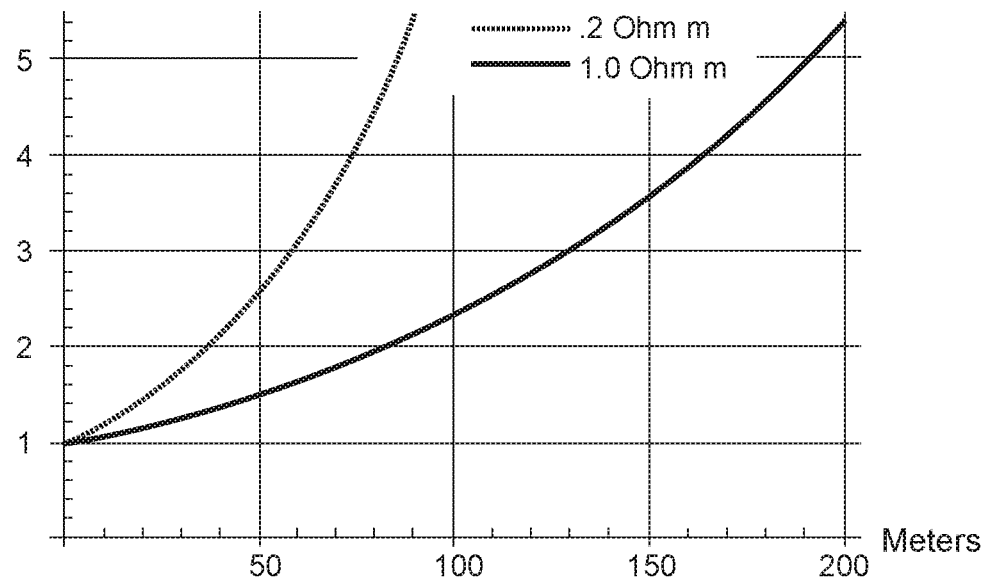
FIG. 10 illustrates a plot of the ratio of the signal amplitudes at the ranging tool having an increased ranging frequency in accordance with the embodiment of FIG. 6.

The effect of increasing the ranging frequency to 25 Hz is shown in FIG. 10. In the past, it has not been desirable to increase the frequency of the ranging frequency because of attenuation, even though resolution is improved with frequency. In the illustrated embodiment, at a range of 90 meters, the ratio of the amplitude of the reference signal to the ranging signal is 5.5, or 14.8 dB which, with other filters in the circuit as described earlier, may be sufficient to provide improved performance when a lock-in amplifier is used.

If the signal is launched as illustrated in the embodiments shown in FIG. 3 or 4, the analysis is analogous to that used for an electromagnetic (EM) telemetry downlink, and the ratio of the signal received as the low frequency reference signal to the ranging signal can be considerably improved over embodiments where both signals are only launched on to the target well. EM downlink signals can typically be received at depths of 10,000 feet. Downlinks are typically strongest when the return leg of the downlink is the casing of a second well, as illustrated in the embodiment of FIG. 4.

In other embodiments, the downhole ranging tool can be designed to receive commands from the earth's surface and select different filters so as to make operation at different frequencies possible. The reference signal can be modulated, included in a separate mud pulse, or EM downlinks may be used to accomplish such an embodiment.

There may be situations where the reference signal is no stronger than the ranging signal. In this case, and where it may be determined that the lock-in amplifier may actually be adding noise to the system, intelligence can be added to detect such a condition, so that the lock-in amplifiers are bypassed.

Launching a signal into a casing is an operation that is known by one of ordinary skill in the art. For example, a target well may have a casing. The target well may be an abandoned or a producing oil or gas well which exists in a field and is to be avoided by a later well being drilled, or may be an existing well that has blown out, and is to be intercepted at a selected depth below the surface of the earth by a relief borehole. Alternatively, the well may represent some other anomaly located in the earth, such as an electrically conductive geological formation, a drill string in an uncased well, or some other electrically conductive material which may be a target for interception or avoidance. For purposes of this disclosure, such material will be referred to as the target well.

While above embodiments discuss launching the ranging signal on the target well casing, other embodiments are not limited to this method of launching the ranging signal. For example, the ranging signal may be launched using a wireline or using an electromagnet.

The bottom-most drill string subsection carries the drill bit in many cases. The drill bit subsection may comprise a bent sub which angles the drill bit with respect to the longitudinal axis of the drill string to permit changes in the direction of drilling, or may be a straight section for straight-ahead drilling. With the use of a bent sub, the direction of drilling may be controlled by rotating the entire drill string from the wellhead, thereby turning the bent sub.

As is known, the drill bit may be driven by a motor which in turn is driven by the flow of drilling mud down the drill string bore. The mud flows out of the drill string at the bent sub and around the location of the drill bit and flows up and out of the well through the annular space around the outside of the string, carrying the material loosened by the drill up and out of the well through an outlet fitting.

Located within the drill string bore may be an alternating magnetic field detector, or magnetometer. The detector may be adapted to detect alternating magnetic fields produced in the earth surrounding the target by alternating current flow induced in the conductive material (such as a well casing) of the target well. This current may be induced by way of an electrode located at the surface of the earth very close to, or, electrically connected to, the casing. The electrode induces a current flow I in the electrically conductive target casing, and this vertically flowing current produces a magnetic field surrounding the casing. The magnetic field lines are perpendicular to the direction of current flow I, and thus are generally horizontal when the well is vertical. The field extends outwardly from the target well casing to a distance dependent upon the magnitude of the current flow and upon the nature of the strata surrounding the target well and the relief borehole.

The electrode, which may be a conductive rod located in the earth near the wellhead or may be a connector for securing a cable to the metal casing, is connected by way of a cable to a source of alternating current (AC). The other side of the AC source is connected to a ground point at a location spaced away from the target well by a distance sufficient to ensure that the current will flow primarily in the casing. As the current flows downwardly in the casing, it will gradually be dissipated outwardly into the surrounding earth, and will return to the ground electrode, but since the current flow in the casing is highly concentrated, as compared to the current flow through the earth, the magnetic field produced by the casing current will predominate and will be detectable by the magnetometer.

A magnet gradiometer, which may be a highly sensitive magnetic field detector, includes a pair of field sensors each having two spaced, parallel legs. The legs may be ferrite rods, each several inches long and surrounded by corresponding solenoidal windings. The magnetic gradiometer may be located in a suitable housing within the central opening of the drill string but alternatively may be mounted on the exterior thereof, as in reduced areas or notches formed on the outer surface of the drill string. In this latter configuration, the two legs of each sensor are mounted on diametrically opposite sides of the drill string so that they are spaced apart by a distance approximately equal to the diameter of the drill string. In either arrangement, the two legs of each sensor have their axes of maximum sensitivity parallel to each other, and perpendicular to the axis of the drill string, while the axes of maximum sensitivity of the two sensors are perpendicular to each other.

When a relief borehole is being drilled, the borehole is initially directed toward the target well through the use of conventional methods. The magnetometer can be located within the drill string or on its surface, and is operable during the actual drilling, although for greatest accuracy the drilling operation would normally be momentarily halted while measurements are made. The information obtained from the magnetometer may be used to control the directional drilling of the relief borehole (as a ranging well), among other uses, as described herein.

Figure 11:
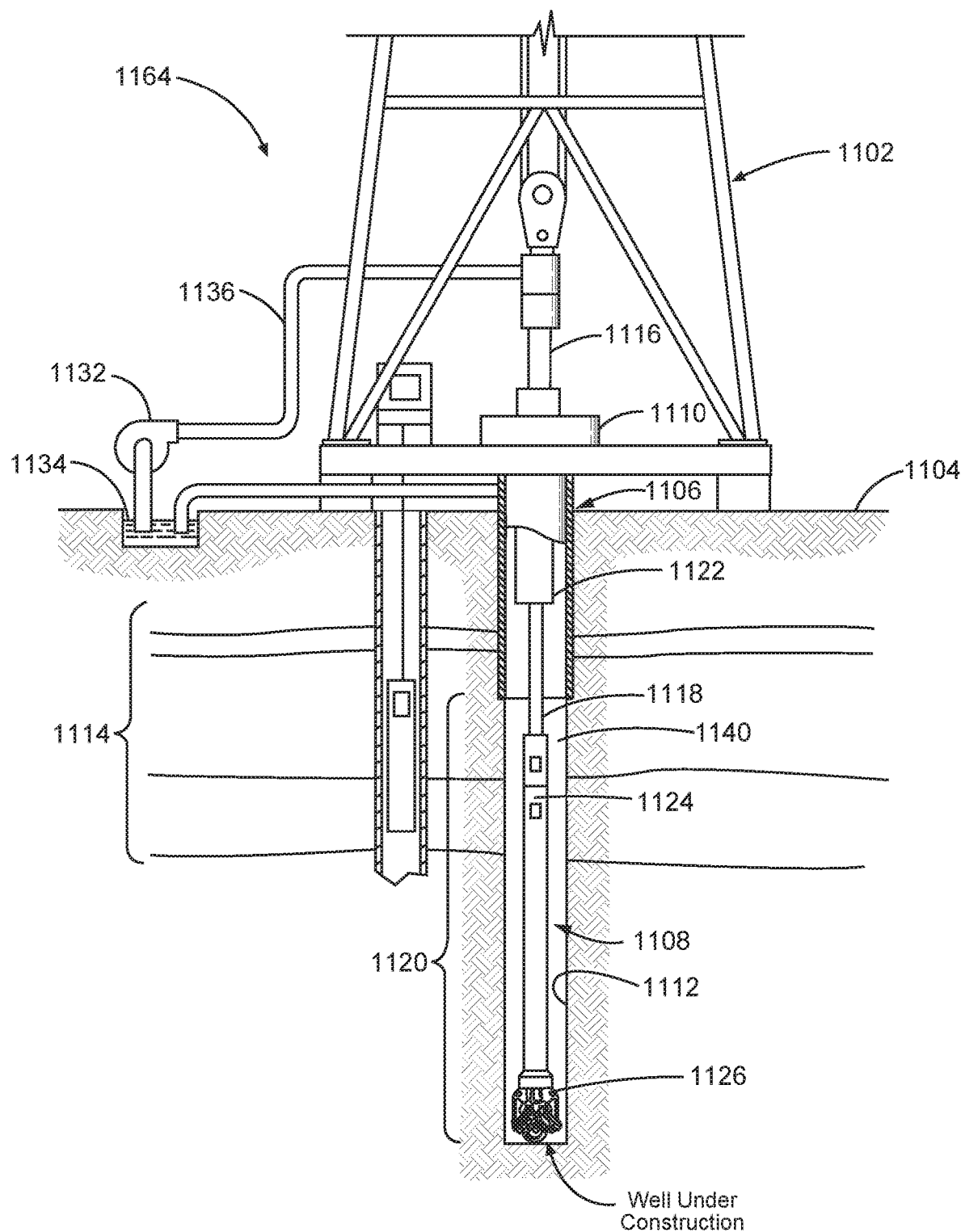
FIG. 11 illustrates wireline and drilling embodiments of a system for target well ranging.

FIG. 11 illustrates a drilling rig system 1164 embodiment that can incorporate the above-described embodiments. Thus, system 1164 may comprise portions of a downhole tool 1124 as part of a downhole drilling operation.

Drilling of oil and gas wells is commonly carried out using a string of drill pipes connected together so as to form a drilling string that is lowered through a rotary table 1110 into a wellbore or borehole 1112. A system 1164 may form a portion of a drilling rig 1102 located at the surface 1104 of a well 1106. The drilling rig 1102 may provide support for a drill string 1108. The drill string 1108 may operate to penetrate a rotary table 1110 for drilling a borehole 1112 through subsurface geological formations 1114. The drill string 1108 may include a Kelly 1116, drill pipe 1118, and a bottom hole assembly 1120, perhaps located at the lower portion of the drill pipe 1118. In some embodiments, ranging tool apparatus 103, 203, 303, 403 of FIGS. 1, 2, 3, 4, respectively, may be carried as part of the drill string 1108 or the downhole tool 1124.

The bottom hole assembly 1120 may include drill collars 1122, a downhole tool 1124, and a drill bit 1126. The drill bit 1126 may operate to create a borehole 1112 by penetrating the surface 1104 and subsurface geological formations 1114. The downhole tool 1124 may comprise any of a number of different types of tools including MWD (measurement while drilling) tools, LWD tools, and others.

During drilling operations, the drill string 1108 (perhaps including the Kelly 1116, the drill pipe 1118, and the bottom hole assembly 1120) may be rotated by the rotary table 1110. In addition to, or alternatively, the bottom hole assembly 1120 may also be rotated by a motor (e.g., a mud motor) that is located downhole. The drill collars 1122 may be used to add weight to the drill bit 1126. The drill collars 1122 may also operate to stiffen the bottom hole assembly 1120, allowing the bottom hole assembly 1120 to transfer the added weight to the drill bit 1126, and in turn, to assist the drill bit 1126 in penetrating the surface 1104 and subsurface formations 1114.

During drilling operations, a mud pump 1132 may pump drilling fluid (sometimes known by those of skill in the art as "drilling mud") from a mud pit 1134 through a hose 1136 into the drill pipe 1118 and down to the drill bit 1126. The drilling fluid can flow out from the drill bit 1126 and be returned to the surface 1104 through an annular area 1140 between the drill pipe 1118 and the sides of the borehole 1112. The drilling fluid may then be returned to the mud pit 1134, where such fluid is filtered. In some embodiments, the drilling fluid can be used to cool the drill bit 1126, as well as to provide lubrication for the drill bit 1126 during drilling operations. Additionally, the drilling fluid may be used to remove subsurface formation 1114 cuttings created by operating the drill bit 1126.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for ranging between a target well and a ranging well, the method comprising:
    generating a clock signal having a first frequency;
    generating a ranging signal from the clock signal, the ranging signal having a second frequency based on the first frequency;
    generating a reference signal from the clock signal, the reference signal having a third frequency that is lower than the first frequency;
    launching the ranging signal from the target well;
    transmitting the reference signal;
    receiving the reference signal with a first receiver in the ranging well;
    reconstructing the clock signal as a reconstructed clock signal based on the received reference signal;
    using one of the first receiver or a second receiver in the ranging well, receiving a signal that is a combination of noise and the ranging signal launched from the target well;
    producing a filtered ranging signal using the reconstructed clock signal in combination with the received signal that is the combination of noise and the ranging signal launched from the target well; and
    determining a relative location of the target well in relation to the ranging well based on the filtered ranging signal.

2. The method of claim 1 wherein reconstructing the clock signal comprises:
    receiving a propagated reference signal;
    generating a pair of quadrature signals from the received propagated reference signal; and
    generating a rectangular signal from the received propagated reference signal.

3. The method of claim 2 further comprising integrating a magnetic field over a time determined by the rectangular signal.

4. The method of claim 3 wherein the time period comprises an integer multiple of an inverse of a fundamental frequency of the clock signal.

5. The method of claim 2, wherein integrating a magnetic field comprises integrating the magnetic field based on the received signal mixed with the pair of quadrature signals.

6. The method of claim 1 further comprising steering a drill bit while drilling the ranging well in response to the relative location.

7. The method of claim 1 wherein generating the reference signal comprises:
    generating an intermediate signal that has a frequency that is m times the first frequency; and
    generating the reference signal using the intermediate signal that has a frequency equal to the frequency of the intermediate signal frequency divided by n wherein m/n<1.

8. The method of claim 1 further comprising monitoring a magnetic field generated by the target well in response to the ranging signal using one of a magnetometer or a gradiometer in the ranging well.

9. The method of claim 1 wherein transmitting the reference signal comprises launching the reference signal into a surface of a geological formation, wherein the geological formation includes the target well and the ranging well.

10. The method of claim 9 wherein launching the reference signal into the surface comprises launching the reference signal with at least one of:
    a loop antenna coupled to the surface or a plurality of ground contacts coupled to the surface.

11. The method of claim 1 further comprising:
    launching the reference signal to a well head of a well casing of the ranging well;
    creating a signal that contains the reference signal and the ranging signal by summing the reference signal and the clock signal; and
    launching the signal that contains the reference signal and the ranging signal down a well head of a casing of the target well.

12. The method of claim 1 wherein the reference signal is not an integral harmonic of the first frequency.

13. A transmitter apparatus comprising:
    an oscillator circuit that generates a clock signal having a first frequency;
    a frequency scaler circuit, coupled to the oscillator circuit, that generates a reference signal having a second frequency that is lower than the first frequency, wherein the reference signal is not an integral harmonic of the first frequency;

a ranging signal generation circuit, coupled to the oscillator circuit and a casing of a target well, to generate a ranging signal having a third frequency based on the first frequency, the ranging signal transmitted on the casing of a target well and down the target well; and a transmitter circuit, coupled to the frequency scaler circuit, configured to transmit the reference signal into a surface of a geological formation;

wherein the reference signal is a received by a receiver in a ranging well; wherein the receiver reconstructs the clock signal as a reconstructed clock signal based on the reference signal; wherein the ranging signal is received by the receiver to produce a filtered ranging signal using the reconstructed clock signal in combination with noise and the ranging signal; and wherein the filtered ranging signal is indicative of a relative location of the target well in relation to the ranging well.

14. The transmitter apparatus of claim 13 wherein the transmitter circuit is at least one of:

a loop antenna coupled to the surface or a plurality of dipole antenna coupled to the surface.

* * * * *